United States Patent [19]

Devos

[11] Patent Number: 4,473,360
[45] Date of Patent: Sep. 25, 1984

[54] UNIVERSAL HOMOKINETIC JOINT

[76] Inventor: Gaston Devos, "La Réale", 06230 Villefranche-sur-Mer, France

[21] Appl. No.: 249,810

[22] Filed: Apr. 1, 1981

[30] Foreign Application Priority Data

Oct. 21, 1980 [FR] France .............................. 80 22479

[51] Int. Cl.³ ............................................. F16D 3/30
[52] U.S. Cl. .................................... 464/144; 464/906
[58] Field of Search ............................. 464/144, 906

[56] References Cited

U.S. PATENT DOCUMENTS

| | | | |
|---|---|---|---|
| 2,321,448 | 6/1943 | Anderson | 464/144 |
| 2,592,023 | 7/1952 | Okoshi | 464/906 X |
| 2,949,022 | 8/1960 | Leon | 464/144 |
| 3,002,364 | 10/1961 | Bellomo | 464/144 |
| 3,133,431 | 5/1964 | Zech | 464/144 |
| 3,338,070 | 8/1967 | Scott | 464/906 X |
| 3,475,924 | 11/1969 | Aucktor | 464/906 X |
| 3,613,397 | 10/1971 | Okoshi | 464/144 |
| 3,965,701 | 6/1976 | Orain | 464/144 |
| 4,000,629 | 1/1977 | Bellomo | 464/144 |
| 4,231,233 | 11/1980 | Krude | 464/144 |
| 4,238,936 | 12/1980 | Devos | 464/144 |

FOREIGN PATENT DOCUMENTS

| | | |
|---|---|---|
| 1370234 | 7/1964 | France . |
| 1404096 | 5/1965 | France . |
| 2025521 | 9/1970 | France . |
| 2259287 | 8/1975 | France . |
| 2309756 | 11/1976 | France . |

Primary Examiner—Stuart S. Levy
Assistant Examiner—Daniel P. Stodola
Attorney, Agent, or Firm—Karl W. Flocks; A. Fred Starobin

[57] ABSTRACT

A homokinetic joint of the type wherein torque is transmitted between two heads by means of balls engaged in tracks formed in said heads, said tracks being in the form of grooves. The axes of both grooves in each of the ball rolling tracks are disposed so as to make an angle with one another both in the radial plane containing the center of the respective ball and the plane perpendicular thereto, containing said center. The angle of the grooves is higher in the radial direction than in the direction perpendicular thereto. The invention is applied to homokinetic joints, whether sliding or not, particularly adapted to automobile vehicles.

3 Claims, 11 Drawing Figures

UNIVERSAL HOMOKINETIC JOINT

The present invention relates to a homokinetic joint of the type in which torque is transmitted between two heads by balls engaged in tracks or races formed in said heads.

Various specific modes of embodiment of a joint of this type are described in the Applicant's U.S. Pat. No. 4,238,936 of Dec. 16, 1980.

It may be reminded briefly that such a joint is essentially characterized in that each track is constituted by two semi-cylindrical grooves formed in the inner head and the outer head respectively so as to receive a ball without play, the cross-sectional diameter of each of said grooves being oriented diagonally with respect to a radial axis passing through the geometrical centre of the joint and perpendicular to the longitudinal axis of both heads, thereby bringing each of the balls to roll while being guided between two poles located on said radial axis which also passes through the geometrical centre of the corresponding ball and two other poles located on an axis perpendicular to said radial axis and also passing through the geometrical centre of said corresponding ball, this arrangement with four poles permitting to exclude the use of intermediary means for constantly and forcibly maintaining the centers of the balls uniformly distributed relative to the geometrical centre of the joint in the bisecting plane of the respective longitudinal axes of both heads and to bring the ball assembly to transmit the torque between both heads in both directions of rotation of the joint, with unitary pressures upon the balls being significantly reduced in one of the directions of rotation.

The various possible forms of embodiment of the joint in accordance with said patent are numerous as a result of the novel technology use.

In particular, the joints may carry a variable quantity of balls and their two heads may either move longitudinally relative to one another with their axial centering being provided by the balls, or conversely be centered longitudinally relative to one another by means of concave surfaces working in convex surfaces which are complementary surfaces respectively formed on the heads.

Experience has shown however that certain forms of embodiment to meet specific criteria had disadvantages in operation.

Thus, with longitudinally centered joints, it may be noted that in the null angle working position the inner head has the tendency to rotate inside the outer head and to cause removal of the balls out of their track.

Moreover, these same joints do not afford the possibility of realizing work with a significant angle.

The present invention relates to a joint of the type as defined above which is improved upon, so as to totally eliminate the above-mentioned defects.

Moreover, in the case of integrated sliding joints, the present invention provides for realization of joints having significant advantages as compared to those known heretofore.

More specifically, the present invention relates to three improved forms of embodiment of the joint according to the type described in the above-mentioned patent of the Applicant, said improved forms of embodiment permitting to produce a joint having axially and longitudinally centered heads making it possible to effect a significant angle of work, since 45° are reached, and 34 mm integrated sliding join having the important advantage of being of the same structure as the centered joints with the spherical portions being simply replaced by planar surfaces, similarity of both joints bringing about an industrially very interesting manufacturing standarization.

The joint in accordance with the present invention being of the type in which each track consists of two semi-cylindrical grooves formed in the inner head and the outer head, respectively, so as to receive a ball without play, with the sectional diameter of each of said grooves being oriented diagonally relative to a radial axis passing through the geometrical centre of the joint and perpendicular to the longitudinal axis of both heads, is characterized in that both grooves forming a ball rolling track are disposed at an angle relative to the longitudinal axis of both heads in the null work position, as seen in a projection upon the plane containing said longitudinal axis and the radial axis passing through the geometrical centre of the corresponding ball, on the one hand, and on the other hand, as seen in a projection, in a smaller degree, upon the orthogonal plane, relative to said radial axis, which passes through the geometrical centre of said ball.

Such arrangement is advantageously completed by giving a supplementary angle to the edge of one of the grooves in the outer head, to permit the joint to effect significant angle work that may reach 45°.

According to another essential characteristic of the invention, the angles of both grooves constituting a rolling track may be different from those of the neighbouring tracks.

Other characteristics and advantages and specificity of the present invention will appear from the following description made in reference to the attached drawings showing explanatively, not limitatively, three possible forms of embodiment of the invention.

Figure 1:
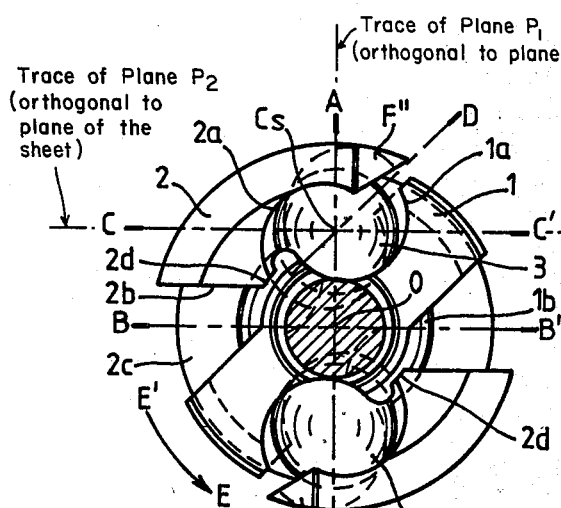
FIG. 1 is a front view of a first possible form of embodiment of a joint according to the invention having axially and longitudinally centered heads and comprising two balls.

In a first possible form of embodiment of the join according to the invention, having two balls and axially and longitudinally centered heads as shown in an exemplifying form on FIGS. 1 to 6, the joint essentially comprises an inner head 1 formed with two grooves 1a and an outer head 2 formed with two complementary grooves 2a. Both groups of two complementary grooves are distributed according to the geometrical centre O of the joint opposite to one another, so as to respectively receive both balls 3 and 3'.

Moreover, the head 1 and 2 of the joint in this form of embodiment are axially and longitudinally centered by means of convex surfaces 2d of the head 2 acting in complementary concave surfaces 1b of the head 1 in a known manner.

Figure 2:
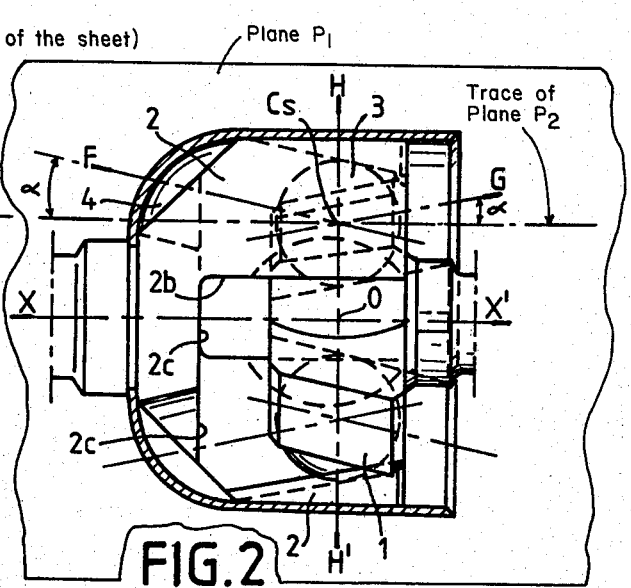
FIG. 2 is a view in profile of the joint of FIG. 1 with the protection housing being shown in longitudinal cross-section and the angle of work of the joint being zero.

In accordance with this invention, the longitudinal axes of the two grooves 1a and 2a constituting a rolling track for the corresponding ball 3, for example, are disposed according to a first orientation F-G at an angle $\alpha$ with respect to the longitudinal axes X—X' of both heads 1 and 2 in a position of null angle of work and intersect on the bisecting plane H—H' as appears distinctly from FIG. 2, as a projection upon the plane $P_1$ containing said axis X—X' and the radial axis A—A' passing through the geometrical centre Cs of ball 3. Furthermore, the same longitudinal axes of the grooves are disposed according to a second orientation F'-G' at an angle $\beta$ with respect to the longitudinal axis X—X' and intersect on the bisecting plane H—H' containing the axis B—B' as shown distinctly on FIG. 3, as seen in a projection upon the orthogonal plane $P_2$ with respect to axis A—A' and containing axis C—C' passing through the geometrical centre Cs of the ball 3.

Figure 3:
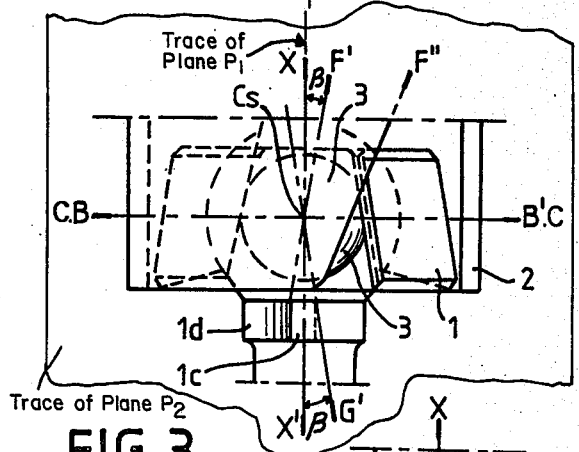
FIG. 3 is a plan view of the joint of FIG. 1 having an angle of work equal to zero, and the outer head being truncated according to line J—J' of FIG. 5.

When the joint lies in an angular position at zero degree as shown on FIGS. 1, 2 and 3 one avoids that under the force of the torque the driving head 1 might turn in the driven head 2 thereby to remove the balls from the track thereof. It is significant to note that according to the invention, to this end, the angles F-G are greater than the angles F'-G'. In other terms, angularity of the grooves is higher in the radial direction than in the direction perpendicular thereto.

Experience has shown that the characteristic of having angularity F-G higher than angularity F'-G' causes the balls to remain positioned in the bisecting plane H—H' when the joint lies in a null angle position.

Furthermore, when the joint moves from the zero degree position mentioned above to angular working the balls cannot move from the bisecting plane H—H' due to the contrary action existing between the angles of each of the two grooves in the same track.

Figure 4:
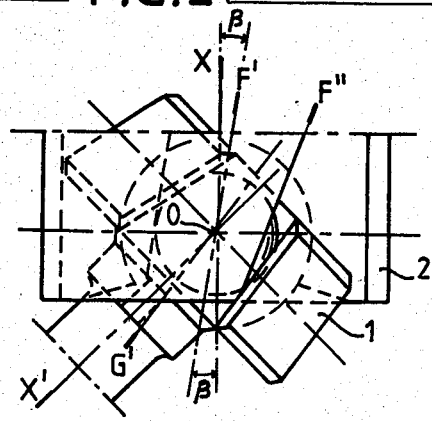
FIG. 4 is a plan view of the joint of FIG. 1 having a maximum angle of work, the outer head being truncated according to line J—J' of FIG. 5.
Figure 5:
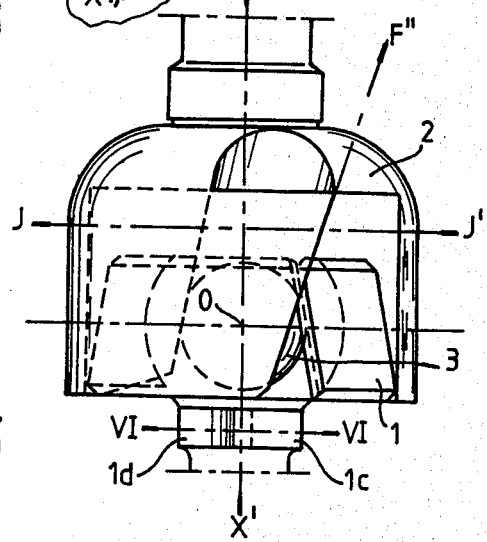
FIG. 5 is a plan view of the joint of FIG. 1 having a null angle work and the outer head not being truncated.
Figure 6:
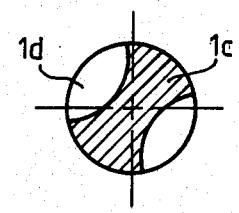
FIG. 6 is a front sectional view along line VI—VI of FIG. 5 of the shaft of the inner head.

According to another characteristic of the present invention, the joint may be permitted a significant angle of work that can reach 45° by imparting a certain angle F''' to the edge of the grooves of the outer head 2 of the joint, it being noted that such angle F'' is higher than angle F' as shown distinctly on FIG. 4 as well as FIGS. 1, 3 and 5.

Moreover, to diminish the required space for the joint, the shaft 1c of the inner head 1 is provided with recesses 1d (please refer more particularly to FIG. 6) in which the portions 2d of the convex surfaces of the outer head 2 are located upon maximum angle of work of the joint. Further, flat portions 2b and 2c (FIGS. 1 and 2) are formed on the outer head 2 to also provide for maximum angle of working.

In this form of embodiment, a housing 4 is used as shown on FIG. 2.

Assuming that shaft 1 is the driving shaft, the direction of rotation E is preferential with respect to the direction of reverse rotation E'. Thus, for accommodating the joint to the automotive vehicle, for example, the direction of rotation E will be that of forward running and the direction E' that of reverse running.

As in the above-mentioned patent of the Applicant, the geometrical centre of each ball lies at the intersection of the radial axis A—A' having a transverse symmetrical axis C—C' perpendicular to the first, with the diagonal D.

It results from mere observation of the drawings that this diagonal arrangement D of the grooves 1a and 2a causes the balls to roll and be guided between two poles located on axis A—A' and two further poles located on axis C—C' perpendicular to axis A—A', with transmission of the torque being effected in this way for each of the balls in the right-hand or left-hand directions.

Figure 7:
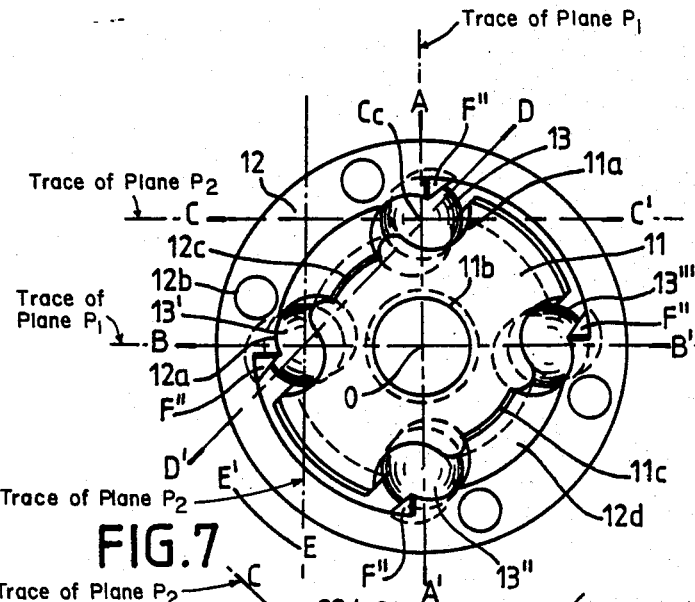
FIG. 7 is a front view of the second possible form of embodiment of a joint according to the invention having axially and longitudinally centered heads and comprising four balls.
Figure 8:
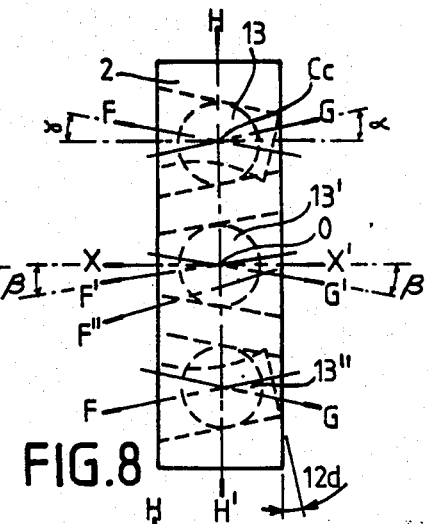
FIG. 8 is a view in profile of the joint of FIG. 7 having a null angle work.

Another possible form of embodiment of the joint according to the invention having axially and longitudinally centered heads is shown as an exemplifying form of embodiment of FIGS. 7 and 8. It is somehow the replica of the forms of FIGS. 1 to 6, but comprises four, instead of two, balls; its inner head 11 is formed with four grooves 11a and its outer head 12 with four grooves 12a; four balls 13,13',13'' and 13''', and convex surfaces 12c and concave surfaces 11c, four fixation holes 12b and an angular stepped portion 12d complete the device.

As for the joint which is the object of FIGS. 1 to 6, theses grooves have orientations F-G and F'-G' as well as angles F'' providing for a significant angle of work of the joint. The axes A—A',B—B',C—C', X—X' as well as diagonal D and the bisecting plane H—H' are the same as those of FIGS. 1 to 6. The directions of rotation E and E' occur without any difference both in the right-hand and the left-hand directions. The structure of said joint provides for an angle of work of 45°.

Figure 9:
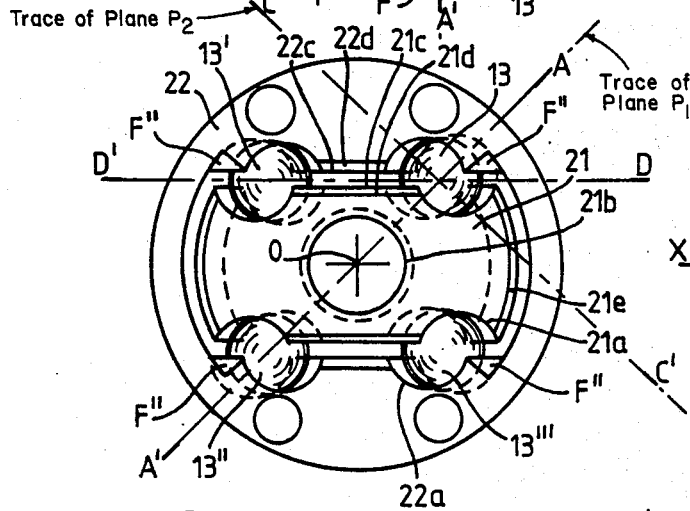
FIG. 9 is a front view of a third possible form of embodiment of a joint according to the invention comprising heads having integrated longitudinal sliding motion and four balls.
Figure 10:
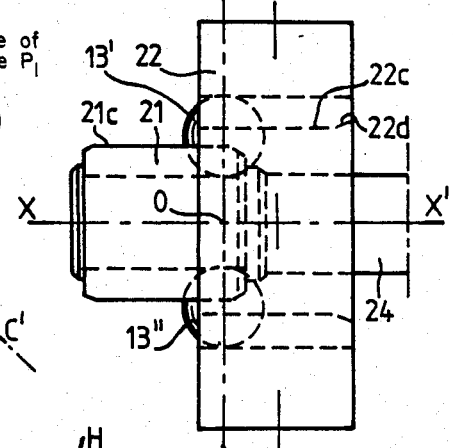
FIG. 10 is a view in profile of the joint of FIG. 9 being in the most compact position and having a null angle work; and, FIG. 11 shows the joint of FIG. 10 in the maximum elongation position and maximum angle work.
Figure 11:
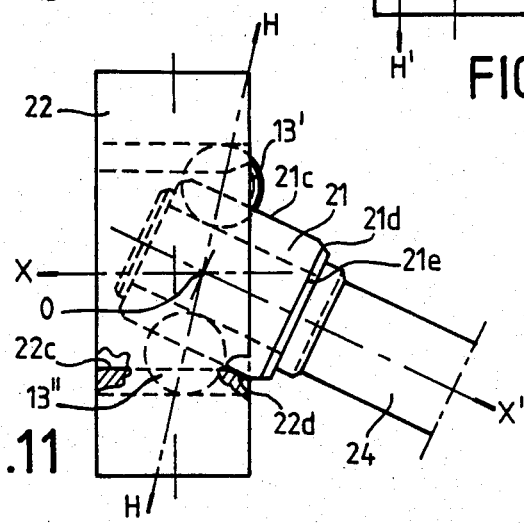

The form of embodiment shown on FIGS. 9 to 11 is that of a sliding joint, the structure of which is practically standardized with respect to the joint of FIGS. 7 and 8; only heads 21 and 22 are wider, and convex and concave surfaces are replaced by flat surface 21c and 22c having bevelled edges 21d and 22d as well as angles F'' providing for angular play of heads 21 and 22, one into the other.

FIGS. 10 and 11 show the positions of the joint from zero degree in the shortened position to 25° for a maximum elongation of 34 mm.

It will be understood that the present invention was only described and represented with respect to a preferential form of embodiment and that equivalent parts can be substituted for its constitutive elements, without departing from the scope thereof as defined in the appended claims.

In particular, according to another characteristic of the invention, the angles F-G and F'-G' between the two grooves 1a-2a, 11a-12a, or 21a-22a, forming a track may possibly be different from those of the neighbouring tracks, it being noted that the angles in the radial direction F-G must always be higher than angles F'-G', in the direction perpendicular thereto.

I claim:

1. A homokinetic joint of the type in which the torque is transmitted between two heads (1, 2; 11, 12; 21, 22) by balls (3, 3', 13 . . . ) fitted in tracks formed in said heads, each of the tracks consisting of two semi-cylindrical grooves (1a, 2a, 11a, 12a) made in an inner head (1, 11, 21) and an outer head (2, 12, 22), respectively, so as to receive a ball (3, 3' . . . ) without play and a sectional diameter (D, D') of each of said grooves being oriented diagonally with respect to a radial axis (AA') passing through the geometrical centre (O) of the joint, perpendicular to the longitudinal axis (XOX') of both heads, wherein the longitudinal axis of both grooves (1a, 2a . . . ) forming a rolling track for a ball (3, 3' . . . ) are disposed so as to make an angle ($\alpha$) with respect to the longitudinal axis (XOX') of the joint, as seen in a projection upon the plane ($P_1$) containing the radial axis (AA') passing through the geometrical centre ($C_s$) of the corresponding ball (3), on the one hand, and on the other hand, an angle ($\beta$) as seen in a projection upon the orthogonal plane ($P_2$) relative to said radial axis (AA') passing through the geometrical centre ($C_s$) of said ball (3), with angularity ($\alpha$) of the grooves being higher in the radial direction (plane $P_1$) than in the direction perpendicular thereto (plane $P_2$), to provide for high angle of work, an edge of the grooves (2a) of the outer head (2) of the joint is given a certain angle F" which is higher than the angle F' presented by each of the grooves (1a, 2a) in the direction perpendicular to the radial axis (AA') of each of said grooves, the angles ($\alpha,\beta$) of the two grooves (1a, 2a) forming a track for a ball (3) may be different from those of the neighbouring tracks, with the angles for balls (3', 13', 13", 13''') in the radial direction (plane $P_1$) having to be higher than the angles ($\beta$) in the direction perpendicular thereto (plane $P_2$).

2. The homokinetic joint according to claim 1 wherein there are two of said tracks and two of said balls causing said two balls to transmit torque in two rotational directions of the joint.

3. The homokinetic joint according to claim 1 wherein said angles ($\alpha,\beta$) of the two grooves are greater than zero.

* * * * *